(12) United States Patent
Matsunaga et al.

(10) Patent No.: US 6,388,719 B1
(45) Date of Patent: May 14, 2002

(54) LIQUID CRYSTAL DISPLAY DEVICE

(75) Inventors: Kuniyuki Matsunaga, Ohmura; Kazuya Nakamura, Mobara; Hikaru Itou, Mobara; Masataka Natori, Mobara; Kimitoshi Oogiichi, Mobara; Takanori Nakayama, Mobara; Hitoshi Komeno, Mobara; Hiroshi Ookawara, Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/593,944

(22) Filed: Jun. 15, 2000

(30) Foreign Application Priority Data

Jul. 12, 1999 (JP) .............................................. 11-197237

(51) Int. Cl.[7] ...................... G02F 1/1339; G02F 1/1333
(52) U.S. Cl. .......................................... 349/40; 349/153
(58) Field of Search ............................ 349/40, 139, 153

(56) References Cited

U.S. PATENT DOCUMENTS

| | | | | |
|---|---|---|---|---|
| 5,200,876 A | * | 4/1993 | Takeda et al. | 349/40 |
| 5,220,443 A | * | 6/1993 | Noguchi | 349/40 |
| 5,323,254 A | * | 6/1994 | Pitt | 349/40 |
| 5,373,377 A | * | 12/1994 | Ogawa et al. | 349/40 |
| 5,691,787 A | * | 11/1997 | Shimada et al. | 349/40 |
| 6,072,550 A | * | 6/2000 | Kim | 349/40 |
| 6,088,073 A | * | 6/2000 | Hioki et al. | 349/40 |
| 6,122,030 A | * | 9/2000 | Nagata et al. | 349/153 |

* cited by examiner

Primary Examiner—Toan Ton
(74) Attorney, Agent, or Firm—Reed Smith LLP

(57) ABSTRACT

A liquid crystal display device can readily achieve uniformization of the threshold voltages of individual thin film transistors in spite of its simple construction. The liquid crystal display device includes gate signal lines juxtaposed in one direction, drain signal lines juxtaposed to intersect with the gate signal lines, thin film transistors which are respectively formed in areas each surrounded by the gate signal lines and the drain signal lines and are driven by supply of scanning signals from the gate signal lines, pixel electrodes to which video signals from the drain signal lines are to be supplied via the respective thin film transistors, a first terminal for applying voltages to the respective gate signal lines via diodes, and a second terminal for applying voltages to the respective drain signal lines via diodes.

9 Claims, 7 Drawing Sheets

LIQUID CRYSTAL DISPLAY DEVICE

BACKGROUND OF THE INVENTION

The present invention relates to a liquid crystal display device and, more particularly, to a so-called active matrix type of liquid crystal display device.

The active matrix type of liquid crystal display device includes a pair of transparent substrates disposed in opposition to each other with a liquid crystal interposed therebetween, gate signal lines formed to be extended in an x-direction and to be juxtaposed in an y-direction on a liquid-crystal-side surface of either one of the pair of transparent substrates, drain signal lines insulated from the gate signal lines and formed to be extended in the y-direction and to be juxtaposed in the x-direction on the liquid-crystal-side surface, thin film transistors which are respectively formed in areas each surrounded by these gate and drain signal lines and are driven by supply of scanning signals from the gate signal lines, and pixel electrodes to which video signals from the drain signal lines are to be supplied via the respective thin film transistors.

These gate signal lines and drain signal lines are formed by micromachining using so-called photolithographic techniques. Accordingly, in the process of manfacturing the liquid crystal display device, it is common practice to inspect whether these gate and drain signal lines are formed without disconnection or whether there is a short circuit between each of these signal lines.

In this case, in order to enable such an inspection to be performed efficiently, a short-circuit lines to which each of the gate signal lines is connected at one end in common and a short-circuit line to which each of the drain signal lines is connected at one end in common are formed, although these short-circuit lines are separated from the gate and drain signal lines by cutting in a later process.

For this reason, on the transparent substrate of the liquid crystal display device manufactured as a product, there remain traces which make it possible to infer that the gate signal lines and the drain signal lines were previously connected to the corresponding short-circuit lines.

The thin film transistor formed in each pixel area is an MIS type transistor which includes a gate electrode made of a portion of the corresponding one of the gate signal lines and a drain electrode made of a portion extended from the corresponding one of the drain signal lines. Accordingly, measures for preventing those signal lines from being charged with concentrated static electricity are taken in order to prevent variations in the threshold voltage of the thin film transistor or breakdown thereof (refer to, for example, Japanese Patent Laid-Open No. 27263/1993).

Specifically, a common line for electrostatic protection which is connected to all of the gate and drain signal lines via nonlinear resistance elements is formed at the outer periphery of a display area formed of an aggregation of the pixel areas, so that static electricity produced in part of the signal lines is dispersed into all of them by the common line. (A circuit constructed in this manner will be hereinafter referred to also as an electrostatic protection circuit.)

However, in the liquid crystal display device constructed in this manner, it has been discovered that the threshold voltages (Vth) of the thin film transistors in the respective pixel areas show dispersion after the completion of the manufacture of the liquid crystal display device.

There are various causes for the variations of the threshold voltages of the thin film transistors, and it may be considered that a method of eliminating such causes is adopted as one method. However, a method of applying predetermined processing to a thin film transistor whose threshold voltage has shown dispersion and uniformizing the threshold voltage is preferable in terms of the efficiency of manufacture.

The present invention has been made in view of the above-described circumstances, and aims to provide a liquid crystal display device which is capable of readily achieving uniformization of the threshold voltage of each thin film transistor in spite of its simple construction.

SUMMARY OF THE INVENTION

Representative aspects of the present invention disclosed herein will be described below in brief.

The liquid crystal display device according to the present invention basically includes gate signal lines juxtaposed in one direction, drain signal lines juxtaposed to intersect with the gate signal lines, thin film transistors which are respectively formed in areas each surrounded by the gate signal lines and the drain signal lines and are driven by supply of scanning signals from the gate signal lines, pixel electrodes to which video signals from the drain signal lines are to be supplied via the respective thin film transistors, a first terminal for applying voltages to the respective gate signal lines via elements each of which allows a current to flow in one direction, and a second terminal for applying voltages to the respective drain signal lines via elements each of which allows a current to flow in one direction.

In the liquid crystal display device constructed in this manner, after the manufacture of the thin film transistors, by applying a voltage between the first terminal and the second terminal, a predetermined voltage can be applied between the gate and the drain of the thin film transistor in each pixel area for a predetermined time.

Accordingly, it is possible to stabilize the structure of each of the thin film transistors that contains a channel layer, thereby uniformizing the threshold voltages of the thin film transistors.

A circuit which connects the first terminal to each of the gate signal fines via the elements and a circuit which connects the second terminal to each of the drain signal lines via the elements remain even after the liquid crystal display device has been manufactured as a product.

Even if such circuits remain, the gate signal lines or the drain signal lines can operate as lines independent of (insulated from) one another during the supply of signals owing to the elements each of which allows a current to flow in one direction.

BRIEF DESCRIPTION OF THE DRAWINGS

Preferred embodiments of the present invention will be described below in detail with reference to the following figures, wherein.

DETAILED DESCRIPTION OF THE PREFERRED EMBODIMENTS

Preferred embodiments of a liquid crystal display device according to the invention will be described below with reference to the accompanying drawings.

[Embodiment 1]

Figure 1:
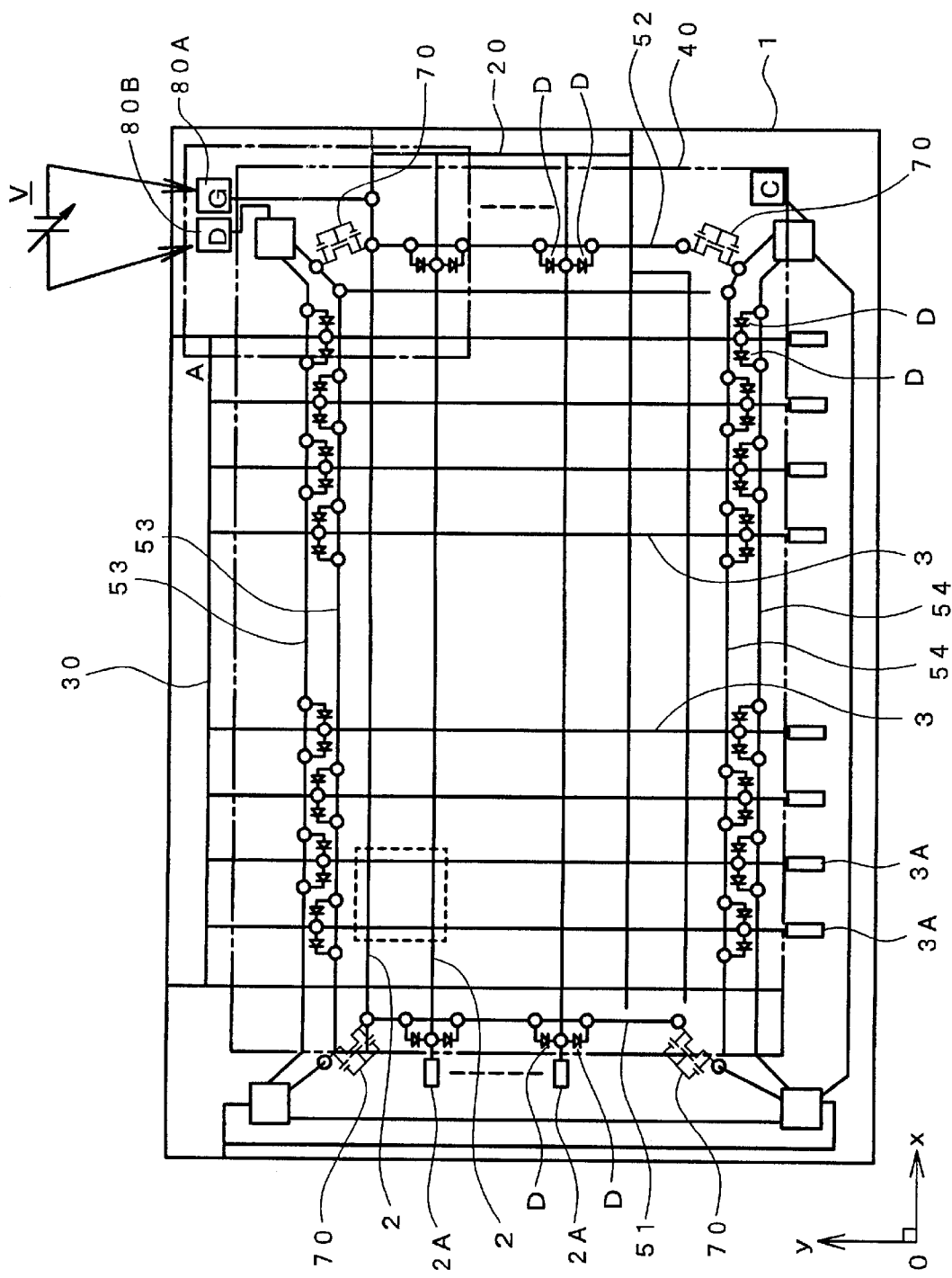
FIG. 1 is a plan view showing one embodiment of a liquid-crystal-side surface of either one of the transparent substrates of a liquid crystal display device according to the present invention.

FIG. 1 is a plan view showing a liquid-crystal-side surface of a transparent substrate 1 which is either one of transparent substrates disposed in opposition to each other with a liquid crystal interposed therebetween.

Referring to FIG. 1, gate signal lines 2 are formed over the upper surface of the transparent substrate 1 in such a manner as to be extended in the x-direction of the liquid-crystal-side surface and to be juxtaposed in the y-direction of the same. Drain signal lines 3 are insulated from the gate signal lines 2 and are disposed to be extended in the y-direction and to be juxtaposed in the x-direction.

Rectangular areas each of which is surrounded by adjacent ones of the gate signal lines 2 and adjacent ones of the drain signal lines 3 are formed as pixel areas (those contained in an area surrounded by two-dot dashed lines in FIG. 1), respectively.

Figure 2A:
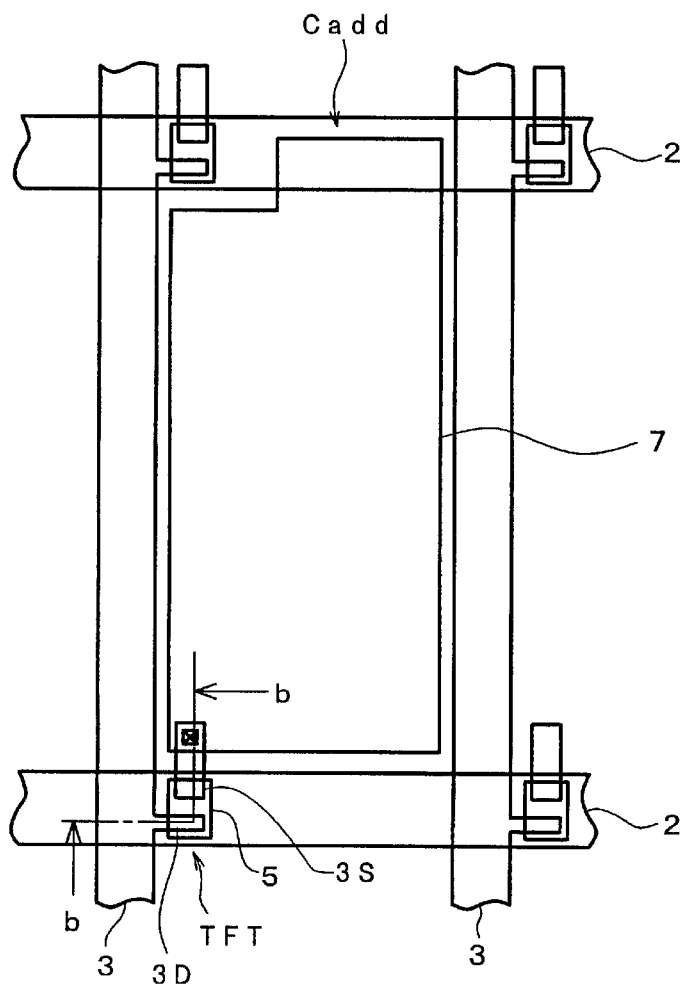
FIGS. 2A and 2B are views showing the construction of one example of a pixel of the liquid crystal display device according to the present invention.
Figure 2B:
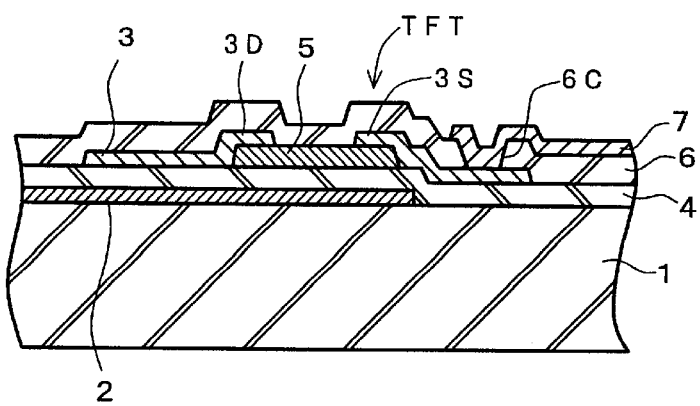

FIGS. 2A and 2B are views showing the construction of one example of the pixel areas, and FIG. 2A is a plan view and FIG. 2B is a cross-sectional view taken along line b—b of FIG. 2B.

The gate signal lines 2 and an insulation layer 4 made of, for example, SiN are formed over the surface of the transparent substrate 1 over which the drain signal lines 3 are formed.

This insulation layer 4 has the function of an interlayer insulation layer for insulating the drain signal lines 3 (to be described later) from the gate signal lines 2, the function of a gate insulating layer in an area in which a thin film transistor TFT (to be described later) is formed, and the function of a dielectric layer in an area in which a capacitance element Cadd (to be described later) is formed.

The thin film transistor TFT is positioned to be superposed on a part of the gate signal line 2 with the insulation layer 4 interposed therebetween, and a semiconductor layer 5 made of, for example, a-Si is formed at that portion. A drain electrode and a source electrode are formed on the surface of the semiconductor layer 5, thereby constituting an MIS type of transistor having an inverse stagger structure having a gate electrode made of a part of the gate signal line 2.

Incidentally, the drain electrode and the source electrode are originally determined by the bias polarity therebetween, and during the operation of this liquid crystal display device, the bias polarity is inverted and the drain and source electrodes are switched therebetween. However, in the following description, for the sake of convenience, one of the electrodes is fixed as a drain electrode and the other is fixed as a source electrode.

Each of these electrodes is formed of, for example, a material identical to that of the drain signal line 3.

Specifically, a part of the drain signal line 3 is formed to be extended to the surface of the semiconductor layer 5, whereby a drain electrode 3D is formed, and a source electrode 3S is also formed at the same time as this drain electrode 3D.

The source electrode 3S is disposed to be extended into a pixel area, and is connected to a pixel electrode 7 in this extended portion.

A protective film 6 made of, for example, SiN is formed over the entire surface of the transparent substrate 1 worked in this manner, and a contact hole 6C which exposes a part of the extended portion of the source electrode 3S is formed in this protective film 6.

The pixel electrode 7 made of, for example, ITO (Indium-Tin-Oxide) is formed over the surface of the protective film 6, and this pixel electrode 7 is connected to the source electrode 3S through the contact hole 6C.

A part of the pixel electrode 7 is superposed on the other adjacent gate signal line 2, and a capacitance element Cadd is formed which uses, as its dielectric film, the insulation layer 4 and the protective film 6 both of which are interposed between the superposed part and the gate signal line 2.

This capacitance element Cadd is provided for the purposes of storing a video signal applied to the pixel electrode 7 for a comparatively long time after the thin film transistor TFT has been turned off.

Although not shown, an alignment layer which is disposed in direct contact with the liquid crystal and determines the initial alignment direction of the liquid crystal is formed over the surface worked in this manner.

Each of the gate signal lines 2 shown in FIG. 1 is formed to be extended at one end (the left side of FIG. 1) so that an input terminal 2A through which to input a scanning signal is formed. Although not shown, this input terminal 2A is connected to an output bump of a scanning signal driver circuit made of a semiconductor IC mounted (Chip On Glass) on the transparent substrate 1.

In addition, each of the gate signal lines 2 is formed to be extended at the other end (the right side of FIG. 1), and there remain traces which show that the extended portions of the respective gate signal lines 2 have been interconnected by a gate short-circuit line 20.

Specifically, the gate signal lines 2 connected to the gate short-circuit line 20 are separated from one another in the vicinity of the gate short-circuit line 20 by, for example, a laser beam which is made to scan in parallel with the gate short-circuit line 20.

Each of the drain signal lines 3 is formed to be extended at one end (the bottom side of FIG. 1) so that an input terminal 3A through which to input a video signal is formed. Although not shown, this input terminal 3A is connected to an output bump of a video signal driver circuit made of a semiconductor IC mounted (Chip On Glass) on the transparent substrate 1.

In addition, each of the drain signal lines 3 is formed to be extended at the other end (the top side of FIG. 1), and there remain traces showing that the extended portions of the respective drain signal lines 3 have been interconnected by a drain short-circuit line 30. The drain signal lines 3 connected to the drain short-circuit line 30 are separated from one another in the vicinity of the drain short-circuit line 30 by, for example, a laser beam which is made to scan in parallel with the drain short-circuit line 30.

Incidentally, the gate signal lines 2 and the drain signal lines 3 are formed to be extended over a sealing material 40 which seals the liquid crystal between the transparent substrates and fixes one of the transparent substrates to the other. The above-described input terminals and short-circuit lines are formed on the outside of the sealing material 40.

The gate short-circuit line 20 and the drain short-circuit line 30 are used to inspect whether disconnection or short-circuiting has occurred in any of the gate signal lines 2 and the drain signal lines 3 after the gate signal lines 2 and the drain signal lines 3 have been formed in the process of manufacturing the liquid crystal display device (in this step, the signal lines and the short-circuit lines are not yet separated from one another).

For example, during an inspection of a short circuit between the gate signal lines 2 and the drain signal lines 3, an inspection probe is brought into contact with a portion between the gate short-circuit line 20 and the drain short-circuit line 30 and a measurement is performed on a current which flows therebetween, whereby the presence or absence of a short circuit between the gate signal lines 2 and the drain signal lines 3 can be detected on the basis of the measured value.

In addition, during an inspection of disconnection of each of the drain signal lines 3, an inspection probe is brought into contact with a portion between the drain short-circuit line 30 and the input terminal 3A of a drain signal line 3 to be inspected, and a measurement is performed on a current which flows therebetween, whereby the presence or absence of disconnection of the drain signal line 3 can be detected on the basis of the measured value.

Incidentally, there are also products such as a liquid crystal display device of the type in which neither the gate short-circuit line 20 nor the drain short-circuit line 30 remains. This is because there is also a manufacturing process of preparing and working a transparent substrate 1 of comparatively large area and cutting the peripheral portion of the transparent substrate 1 together with the gate short-circuit line 20 and the drain short-circuit line 30 formed on a surface of the peripheral portion.

In this case, since the gate signal lines 2 and the drain signal lines 3 are formed to be extended to the cut ends of the transparent substrate 1, the traces of the lines 2 and 3 are present.

An electrostatic protection circuit is formed at the periphery of a display area which is an aggregation of the pixels areas.

This electrostatic protection circuit is formed in an area inside the sealing material 40 in such a manner as to surround the outer periphery of the display area.

This electrostatic protection circuit includes a first common line 51 and a second common line 52 which are respectively formed on the left and right sides of the display area (the area defined by the aggregation of the pixel areas) in such a manner as to intersect with the gate signal lines 2.

These first common line 51 and second common line 52 are insulated from the gate signal lines 2 by the insulation layer 4, and are made of, for example, a material identical to that of the drain signal lines 3.

In the vicinity of each of the intersections of the first common line 51 and the individual gate signal lines 2, a nonlinear resistance element D is connected between each of the gate signal lines 2 and the portion of the first common line 51 that lies on one side of each of the gate signal lines 2, as well as between each of the gate signal lines 2 and the portion of the first common line 51 that lies on the other side of each of the gate signal lines 2.

Similarly, in the vicinity of each of the intersections of the second common line 52 and the individual gate signal lines 2, a nonlinear resistance element D is connected between each of the gate signal lines 2 and the portion of the second common line 52 that lies on one side of each of the gate signal lines 2, as well as between each of the gate signal lines 2 and the portion of the second common line 52 that lies on the other side of each of the gate signal lines 2.

Since the electrostatic protection circuit is provided in this manner, even if static electricity penetrates, for example, several ones of the gate signal lines 2, the static electricity is dispersed into the other ones via the nonlinear resistance elements D, whereby it is possible to prevent the breakdown or the like of each of the thin film transistors TFT connected to the gate signal lines 2.

In addition, the electrostatic protection circuit includes third common lines 53 and fourth common lines 54 which are respectively formed on the top and bottom sides of the display area (the area defined by the aggregation of the pixel areas) in such a manner as to intersect with the drain signal lines 3.

These third common lines 53 and fourth common lines 54 are insulated from the drain signal lines 3 by the insulation layer 4, and are made of, for example, a material identical to that of the gate signal lines 2.

Incidentally, although in the embodiment shown in FIG. 1 each two of third common lines 53 and fourth common lines 54 are formed, the number of third common lines 53 and that of fourth common lines 54 may also be one each.

In the vicinity of each of the intersections of the third common lines 53 and the individual drain signal lines 3, a nonlinear resistance element D is connected between each of the drain signal lines 3 and the portion of either of the third common lines 53 that lie on one side of each of the drain signal line 3, as well as between each of the drain signal lines 3 and the portion of either of the third common lines 53 that lies on the other side of each of the drain signal lines 3.

Similarly, in the vicinity of each of the intersections of the fourth common lines 54 and the individual drain signal lines 3, a nonlinear resistance element D is connected between each of the drain signal lines 3 and the portion of either of the fourth common line 54 that lies on one side of each of the drain signal lines 3, as well as between each of the drain signal lines 3 and the portion of either of the fourth common lines 54 that lies on the other side of each of the drain signal lines 3.

Since the electrostatic protection circuit is provided in this manner, even if static electricity penetrates, for example, several ones of the drain signal lines 3, the static electricity is dispersed into the other ones via the nonlinear resistance elements D, whereby it is possible to prevent the breakdown or the lie of each of the thin film transistors TFT connected to the drain signal lines 3.

High resistance elements 70 are respectively connected between the first common line 51 and the fourth common lines 54, between the fourth common lines 54 and the second common line 52, between the second common line 52 and the third common lines 53, and between the third common lines 53 and the first common line 51.

These high resistance elements 70 provide substantial electrical separation between the gate short-circuit line 20 and the drain short-circuit line 30, thereby solving the problem that occurs during an inspection of a short circuit, for example, between the gate signal lines 2 and the drain signal lines 3.

At least one of the gate signal lines 2 is formed to be extended to the outside of the sealing material 40, and a terminal 80A which is either one of terminals for stabilizing the thin film transistors TFT is formed in a portion into which at least one of the gate signal lines 2 is extended.

This terminal 80A is connected to, for example, one of the gate signal lines 2, and is consequently connected to all the gate signal lines 2 via the second common line 52 and the nonlinear resistance elements D.

At least one of the drain signal lines 3 is formed to be extended to the outside of the sealing material 40, and a terminal 80B which is either one of the terminals for stabilizing the thin film transistors TFT is formed adjacently to the terminal 80A in a portion into which at least one of the drain signal lines 3 is extended.

This terminal 80B is connected to, for example, one of the drain signal lines 3, and is consequently connected to all the drain signal lines 3 via the third common lines 53 and the nonlinear resistance elements D.

These terminals 80A and 80B for stabilizing the thin film transistors TFT are provided for enabling variations of its threshold voltages (Vth) due to various causes such as electrostatic electricity to be stabilized through a simple process after the manufacture of the thin film transistors TFT.

Specifically, after the manufacture of the thin film transistors TFT, the threshold voltages (Vth) of the respective thin film transistors TFT can be uniformly ensured by applying predetermined voltages from the respective terminals 80A and 80B for a predetermined time. The reason for this seems to be that the structures of the thin film transistors TFT that contain channel layers can be stabilized. The process of applying the predetermined voltages from the respective terminals 80A and 80B for the predetermined time and applying a voltage between the drain electrode 3A of each of the thin film transistors TFT and the corresponding one of the gate signal lines 2 is hereinafter referred to as a bias process.

In the bias process, the application of a voltage to each of the gate signal lines 2 is unidirectional via the corresponding one of the nonlinear resistance elements D (which function as diodes). In addition, since the ON resistance of each of the nonlinear resistance elements D is set higher than that of the corresponding driver circuit for driving the liquid crystal display device, each of the gate signal lines 2 operates as an independent (insulated) line when the liquid crystal display device is being driven by the supply of a scanning signal.

Similarly, the application of a voltage to each of the drain signal lines 3 is unidirectional via the corresponding one of the nonlinear resistance elements D (which function as diodes). In addition, since the ON resistance of each of the nonlinear resistance elements D is set higher than that of the corresponding driver circuit for driving the liquid crystal display device, each of the drain signal lines 3 operates as an independent (insulated) line when the liquid crystal display device is being driven by the supply of a video signal.

Figure 3:
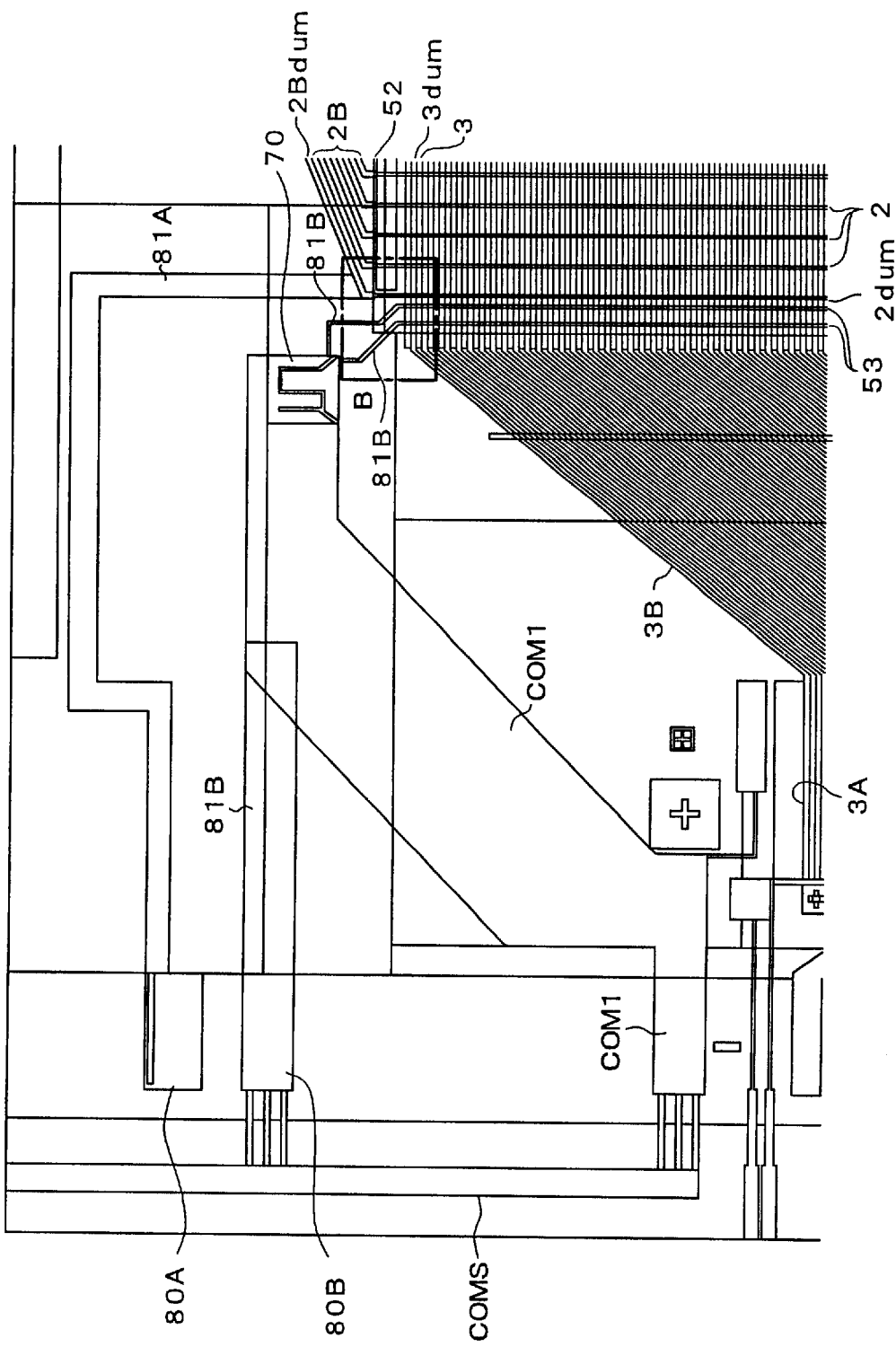
FIG. 3 is an enlarged plan view showing details of the portion surrounded by a dot-dashed-line frame of FIG. 1.
Figure 4:
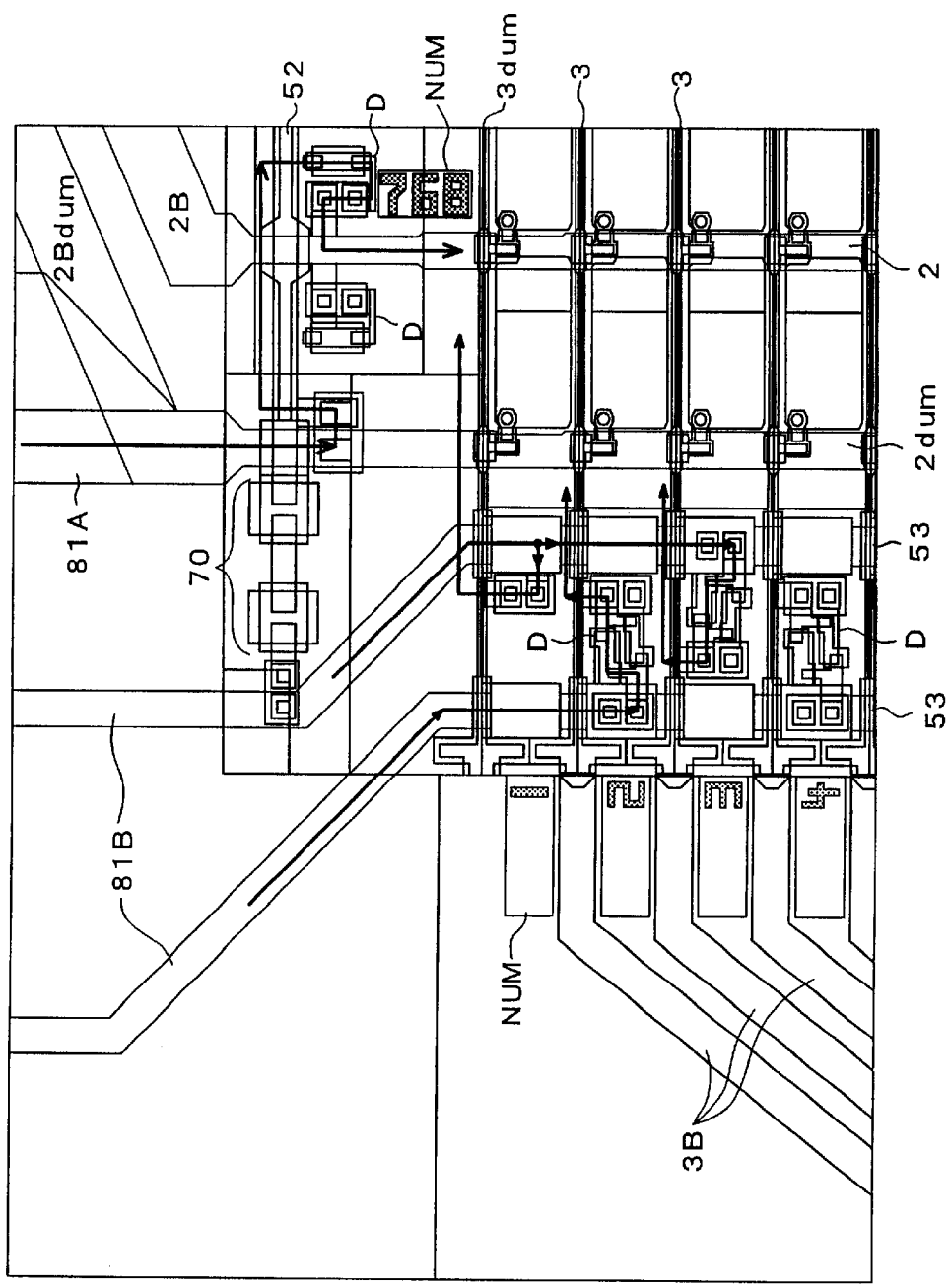
FIG. 4 is an enlarged plan view showing details of the portion surrounded by a dot-dashed-line frame of FIG. 3.

FIG. 3 is an enlarged view of the portion shown in a dot-dashed-line frame A of FIG. 1 (a diagram of a pattern formed in an actual product), and FIG. 4 is an enlarged view of the portion shown in a dot-dashed-line frame B of FIG. 3 (a diagram of a pattern formed in an actual product).

In FIG. 4, each arrow shown by a thick line denotes a path along which the voltage applied to the terminal 80A is applied to each of the gate signal lines 2, while each arrow shown by a thin line denotes a path along which the voltage applied to the terminal 80B is applied to each of the drain signal lines 3.

In FIG. 4, the nonlinear resistance elements D of the electrostatic protection circuit interposed between the terminal 80A and the gate signal lines 2 and the nonlinear resistance elements D of the electrostatic protection circuit interposed between the terminal 80B and the drain signal lines 3 have a similar construction which is formed in parallel with the thin film transistors TFT formed in the respective pixels. Each of the nonlinear resistance elements D has a construction in which either one of the drain and the source is connected to the gate in the construction of the thin film transistor TFT.

In FIG. 3, a wiring layer 81A is extended from the terminal 80A for thin film transistor stabilization and connects it to the dummy gate signal line 2dum in the terminal. The dummy Gate signal line 2dum does not participate in an image display operation of a liquid crystal display directly. The dummy gate signal line 2dum is formed around the image display area.

The wiring 2Bdum is extended to the end part of the transparent substrate 1 from the connection part of the wiring layer 81A and the dummy gate signal line 2dum, and it is connected to the gate short circuit line 20.

In FIG. 3, the wiring layer 81B is connected to a common electrode drawing part COM1 in the middle of an extension from the terminal 80B for thin film transistor stabilization. The wiring layer 81B parts from the common electrode drawing part COM1 to 2 pieces. 2 lines of the wiring layer 81B extend into dashed line frame B and connect each to one of the third common line 53.

The common electrode drawing part COM1 shown to FIG. 3 is connected to the short-circuit line COMS of common electrode wiring in the other end on the substrate fringe side. The wiring layer 2B is connected to each gate signal line 2. Each gate signal line receives the scanning signal that is transmitted from the input terminal 2A arranged in the transparent substrate 1 fringe. The wiring layer 3B is connected to each drain signal line. The image signal that is transmitted from the input terminal 3A arranged in the transparent substrate 1 fringe.

As it is shown in FIG. 4, one side of the wiring layer 81B that parts to 2 lines is connected to the wiring layer 81A (wiring layer 2Bdum) and the second common line 52 through a high large resistance element 70.

As it is shown in the arrow in FIG. 4, the voltage signal from the terminal 80A is applied to 768th gate signal line 2 through the wiring layer 81A and the second common line 52. The number of this gate signal line 2 is recognized in figure NUM of 768 formed between the gate signal line 2 and the second common line 52. The pattern of same figure NUM also is formed to the upper part of the wiring layer 3B that is connected to the each the drain signal line 3.

Each paired wiring layer 81B that is shown to FIG. 4 is connected to either one of the third common lines 53 formed to the right and left per 2 lines.

A voltage is applied to the drain signal line 3 of odd-numbered numbers through wiring layer 81B on the left side in FIG. 4 and the third common line 53 from the terminal 80B. A voltage is applied to drain signal line 3 of even-numbered numbers through wiring layer 81B on the right side in FIG. 4 and the third common line 53 from the terminal 80B. And, through the wiring layer 81B on the right side in FIG. 4 and the third common line 53, a voltage also is applied to dummy drain signal line 3dum from the terminal 80B.

The transparent substrate 1 shown in FIG. 1 is disposed on the other transparent substrate with the liquid crystal interposed therebetween, and a black matrix, color filters, a transparent common electrode and the like are formed over the liquid-crystal-side surface of the latter transparent substrate. The black matrix is formed to frame each of the pixels, and the color filters are formed in the openings of this black matrix (the pixel areas), respectively. The transparent common electrode is formed over the entire area of the display portion made of the aggregation of the pixels.

The liquid crystal display device having this construction is called a vertical electric field type because the direction of an electric field generated between each pixel electrode and the common electrode is nearly perpendicular to the transparent substrates.

[Embodiment 2]

Figure 5:
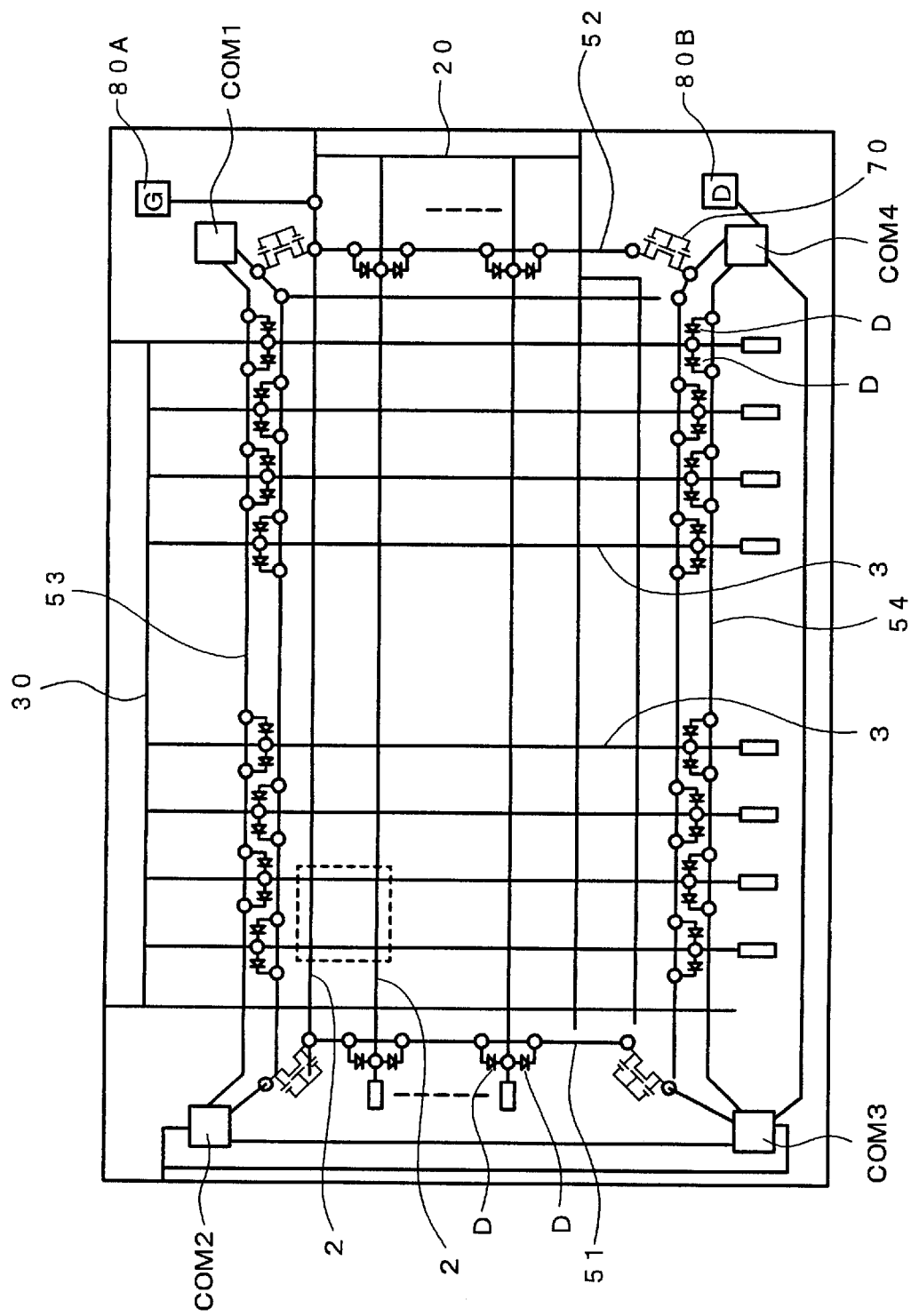
FIG. 5 is a plan view showing another embodiment of the liquid-crystal-side surface of either one of the transparent substrates of the liquid crystal display device according to the present invention.

FIG. 5 is a plan view similar to FIG. 1, showing another embodiment of the liquid crystal display device according to the present invention.

The construction shown in FIG. 5 differs from that shown in FIG. 1 in that the terminal 80A capable of applying voltages to the respective gate signal lines 2 via the corresponding nonlinear resistance elements D and the terminal 80B capable of applying voltages to the respective drain signal lines 3 via the corresponding nonlinear resistance elements D are not provided adjacently to each other, and are respectively formed at comparatively widely spaced locations.

In this case as well, it goes without saying that it is possible to provide an advantage similar to that of the above-described embodiment.

However, in the case of the construction of Embodiment 1, the liquid crystal display device can be constructed so that a pair of probe terminals secured to a device (not shown) for supplying voltages to the gate signal lines 2 and the drain signal lines 3 are disposed to be adjacent to each other at locations corresponding to the terminals 80A and 80B.

In addition, it goes without saying that either or both of the terminals 80A and 80B spaced apart from each other may also be used as other terminals.

This is because these terminals 80A and 80B are used not for driving the liquid crystal display device but for detection or adjustment purposes, and are hardly reused after their purposes have been accomplished and in some cases, are used as other terminals.

[Embodiment 3]

Figure 6:
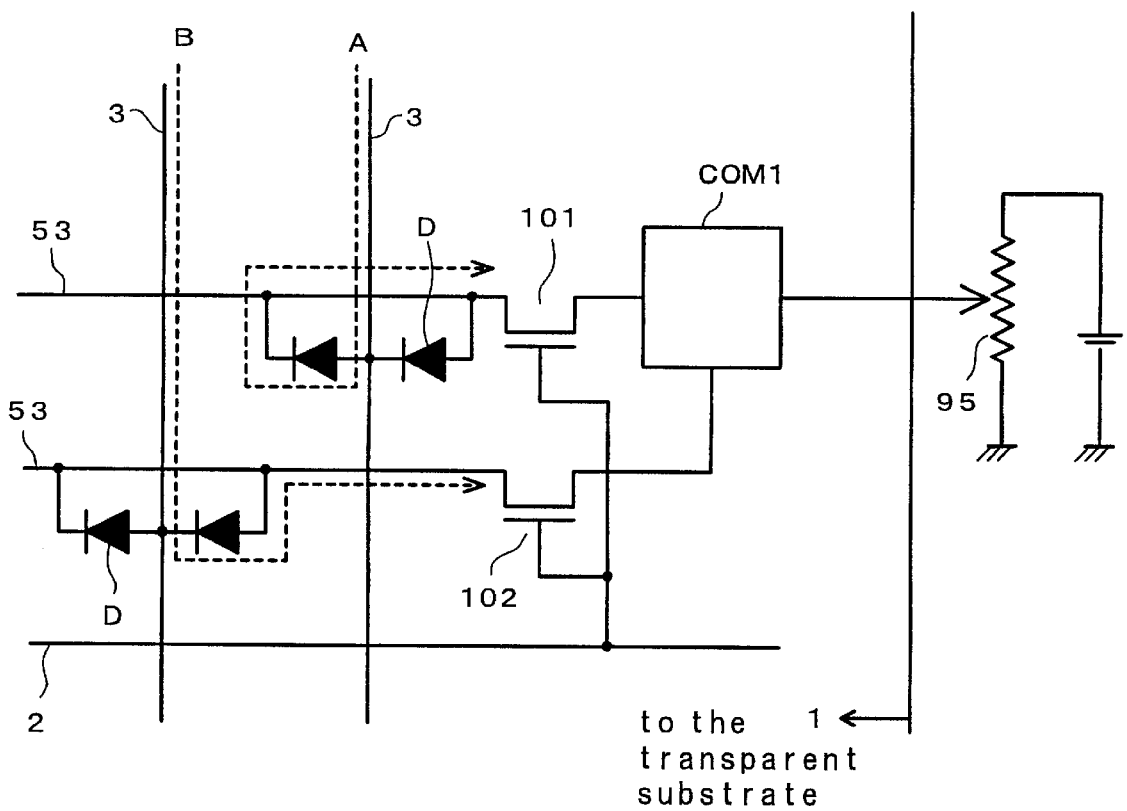

FIG. 6 is the equivalent circuit that shows another embodiment of the liquid crystal display device according to the present invention. FIG. 6 shows the connection part of the common electrode drawing part COM1 that is shown in FIG. 1 and the third common line 53 of a circuit for electrostatic protection.

The common electrode drawing part COM1 (COM2 and COM3 and also COM4 that are shown in FIG. 1 are similar to COM1) that is shown in FIG. 6 is an electrode connecting two substrates electrically. A transparent common electrode (it also tells of an opposed electrode) is formed on the side of the liquid crystal of other transparent substrates that are opposed to the transparent substrate 1. A conduction material is arranged between a transparent common electrode and common electrode drawing part COM1. The transparent substrate 1 and other transparent substrates are electrically connected in common electrode drawing part COM1.

As it is shown in FIG. 6, a voltage is supplied to the common electrode drawing part COM1 by an external circuit. A voltage is adjusted by variable resistance 95, etc. in the external circuit. The voltage that is applied to the common electrode drawing part COM1 is standardized against the signal voltage of the picture element electrode 7.

The third common line 53 of a circuit for electrostatic protection is connected to the common electrode drawing part COM1 also to diffuse static electricity to the common electrode.

Elements 101 and 102 are connected between the third common line 53 and the common electrode drawing part COM1. The element 101 and the element 102 restrict an electric current between the third common line 53 and the common electrode drawing part COM1. By a reason of which provision with elements 101 and 102 is the following. In case for example, while a liquid crystal display drives, the signal of a white level is supplied to one in drain signal line 3. As it is shown to dotted line arrow A in FIG. 6, the signal of a white level is supplied to the common electrode drawing part COM1 through nonlinear element D of an electrostatic protection circuit and a common line. In case the signal of a black level is supplied to one in drain signal line 3. As it is shown to dotted line arrow B in FIG. 6, the signal of a black level is supplied to the common electrode drawing part COM1 through nonlinear element D of an electrostatic protection circuit and a common line. As it was mentioned above, when a signal is applied to a common electrode from drain signal line 3, the level of the voltage that is applied to a common electrode fluctuates. To prevent the level of the voltage that is applied to a common electrode become unstable, elements 101 and 102 restrict the electric current that flows from each drain signal line 3 to the common electrode.

For example, each element 101 and 102 is composed of the transistor of MIS type that is formed simultaneously with the thin film transistor TFT that is formed in the display area. The gate electrode of elements 101 and 102 is connected to the gate signal line 2 that is formed for a dummy.

The dummy gate signal line is connected to the gate electrode of a dummy picture element. The dummy picture element is provided in the most upper step and most lower step of a picture element area. The dummy picture element is shaded in the mask that is formed to other transparent substrate sides.

The dummy picture element is provided for the purpose of equalizing display quality. A capacity arises between a picture element and an adjoining gate line, and display quality is reduced. A condition with the picture element that adjoins a dummy picture element by forming a dummy picture element is made the same condition as other picture elements in a capacity, etc., and equalization of the quality of a display is being planned.

Figure 7:
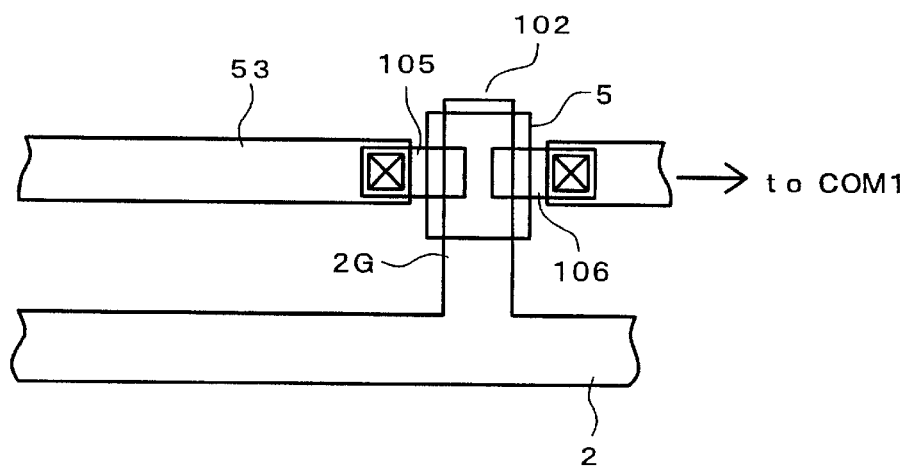

FIG. 7 is a plan view of the structure of element 102. A part of the dummy gate signal line 2 is extended, and the gate electrode 2 G of element 102 is being formed. When gate signal line 2 is formed, the third common line 53 is formed, and this third common line 53 is divided into the sections in the formation area of above element 102. A insulation film 4 obtains the gate electrode 2G. A semiconductor layer 5 is formed on the insulation film 4. Through insulation film 4, it is piled to the semiconductor layer 5, and a source electrode 105 and a drain electrode 106 are formed. The source electrode 105 is connected to the third common line 53 on the drain signal line side through the contact hole that opens on insulation film 4. The drain electrode 106 is connected to the third common line 53 on the drain signal line side through the contact hole that opens on insulation film 4. By forming simultaneously with the drain signal line 3, the source electrode 105 and the drain electrode 106 can reduce the man-hour of manufacturing.

In the example mentioned above, the connection part of the third common line 53 of a circuit for electrostatic protection and common electrode drawing part COM1 was shown. It becomes structure that is similar to an example also mentioned above in the connection part of the common electrode drawing part COM2 and the third common line 53 of a circuit for electrostatic protection. And, it is also same in the connection part of the fourth common line 54 of a circuit for electrostatic protection and each common electrode drawing part COM3 and COM4.

Figure 8:
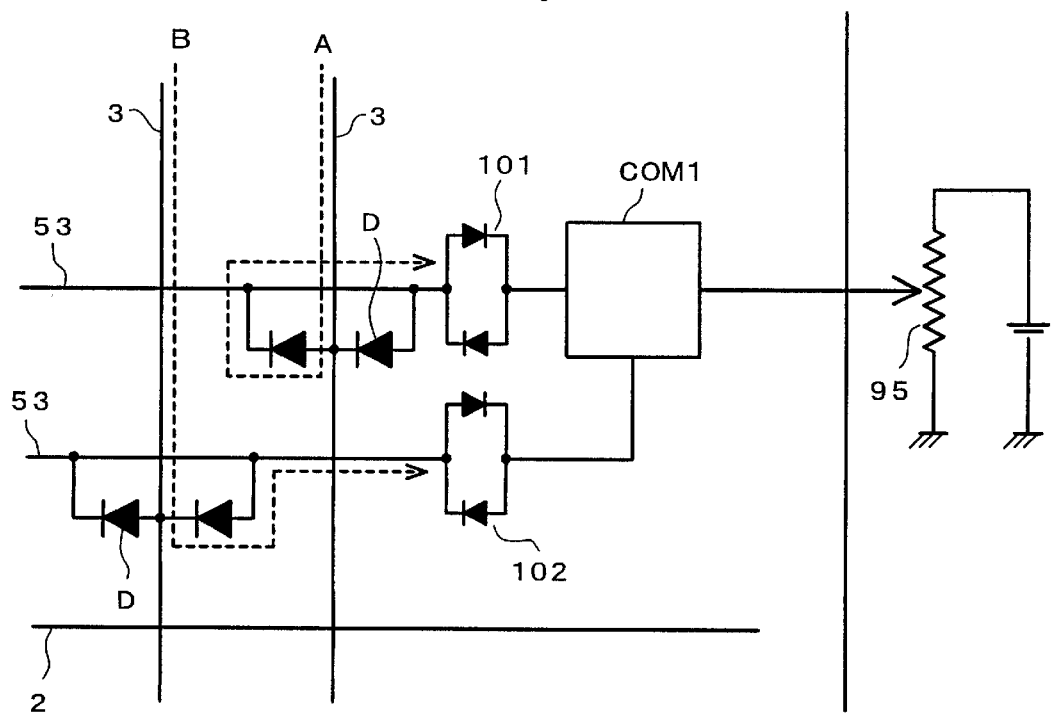
Figure 9:
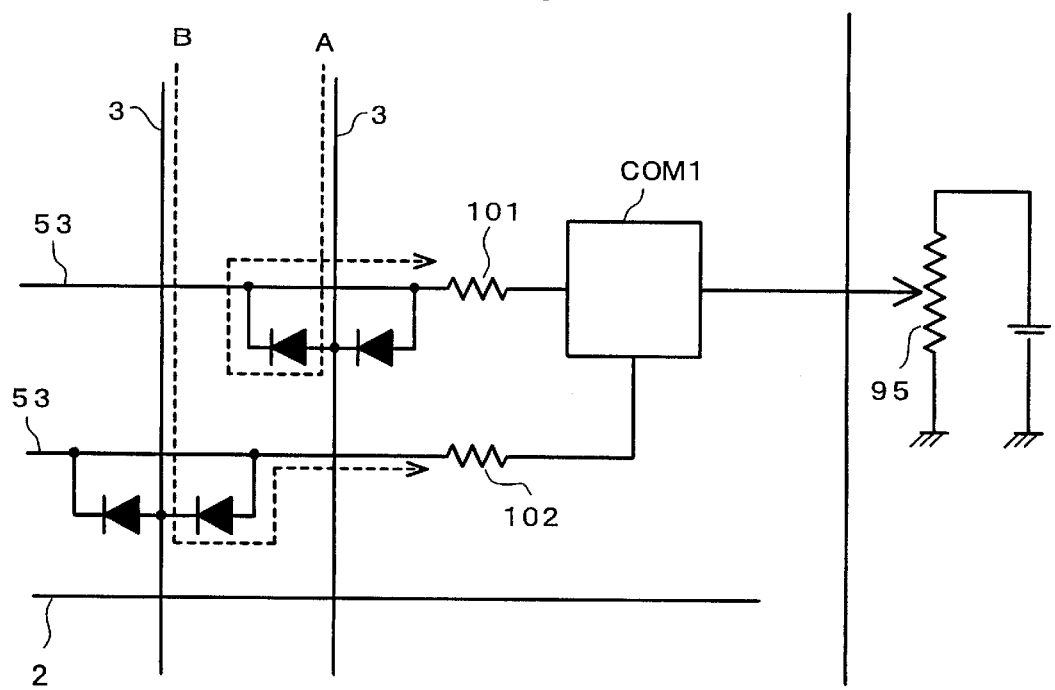

Instead of a MIS type transistor, the two-way diode of FIG. 8 can be used as elements 101 and 102. Or high resistance that is shown in FIG. 9 can be used as elements 101 and 102. As high resistance that is shown in FIG. 9, the man-hour of manufacturing can be reduced by using semiconductor layer 5 that is used at the time of formation of thin film transistor TFT that is formed in the display area.

[Embodiment 4]

Each of the above-described embodiments adopts a construction in which the common lines and the nonlinear elements incorporated in the electrostatic protection circuit formed previously are used as means for unidirectionally applying voltages to the respective ones of the gate signal lines 2 and the drain signal lines 3.

However, it is a matter of course that instead of using the electrostatic protection circuit (therefore, the electrostatic protection circuit may not be provided), dedicated circuits for stabilizing the thin film transistors may be formed and terminals for applying voltages may be provided on the respective circuits.

The above description of each of the embodiments has referred to a so-called vertical electric field type of liquid crystal display device. However, it is a matter of course that the present invention can similarly be applied to a lateral electric field type of liquid crystal display device.

This is because the lateral electric field type of liquid crystal display device is constructed nearly similarly to the vertical electric field type, except for a construction in which its counter electrodes disposed in opposition to its pixel electrodes are disposed in nearly the same plane together with the pixel electrodes and light is transmitted between the pixel electrodes and the counter electrodes in a direction nearly perpendicular to that plane.

As is apparent from the foregoing description, according to the liquid crystal display device according to the present invention, in spite of its simple construction, it is possible to readily achieve uniformization of the threshold voltages of the respective thin film transistors.

What is claimed is:

1. A liquid crystal display device comprising:
   a first substrate and a second substrate disposed in opposition to each other;
   a liquid crystal layer interposed between the first substrate and the second substrate;
   gate signal lines provided on the first substrate and arranged in one direction;
   drain signal lines provided on the first substrate to intersect with the gate signal lines;
   thin film transistors which are respectively formed in areas each surrounded by the gate signal lines and the drain signal lines and are driven by supply of scanning signals from the gate signal lines;
   a first common line electrically connected with the gate signal lines via high resistance elements;
   a second common line electrically connected with the drain signal lines via high resistance elements;
   a first terminal for applying voltages to the first common line; and
   a second terminal for applying voltages to the second common line,
   wherein the first common line is electrically connected with the second common line via high resistance elements.

2. A liquid crystal display device according to claim 1, wherein the high resistance elements are diodes.

3. A liquid crystal display device according to claim 1, wherein the high resistance elements are nonlinear elements.

4. A liquid crystal display device comprising:
   a liquid crystal display panel;
   gate signal lines provided on the liquid crystal display panel and disposed to extend in an x-direction and to be juxtaposed in a y-direction;
   drain signal lines insulated from the gate signal lines and disposed to extend in the y-direction and to be juxtaposed in the x-direction;
   thin film transistors which are respectively provided in areas each surrounded by the gate signal lines and the drain signal lines and are driven by supply of scanning signals from the gate signal lines;
   pixel electrodes to which video signals are to be supplied from the drain lines via the respective thin film transistors;
   a first common signal line juxtaposed to the drain signal lines;
   a second common signal line juxtaposed to the gate signal lines;
   a first terminal connected to the first common signal line;
   and a second terminal connected to the second common signal line, wherein the first common signal line is connected to the gate signal lines via high resistance elements,
   the second common signal line is connected to the drain signal lines via high resistance elements, and
   the first common signal line connected to the second common line via high resistance elements.

5. A liquid crystal display device according to claim 4, wherein the high resistance elements are diodes.

6. A liquid crystal display device according to claim 4, wherein the high resistance elements are nonlinear elements.

7. A liquid crystal display device comprising:
   a first substrate and a second substrate disposed in opposition to each other;
   a liquid crystal layer interposed between the first substrate and the second substrate;
   plural gate signal lines provided in a liquid-crystal-side area of the first substrate;
   plural drain signal lines which intersect with the gate signal lines;
   thin film transistors to be driven by supply of scanning signals from the gate signal lines;
   pixel electrodes to which video signals from the drain signal lines are to be supplied via the thin film transistors;
   a pixel area in which plural pixel electrodes are disposed in matrix form;
   a sealing material which is formed to surround the pixel area and fixes the first substrate and the second substrate to each other;
   a first common line connected to the plural gate signal lines via high resistance elements;
   a second common line connected to the plural, drain signal lines via high resistance elements;
   a first terminal for applying voltages to the first common line;
   a second terminal for applying voltages to the second common line;
   wherein the first common line extends to outside of the sealing material,
   the second common line extends to outside of the sealing material, the first terminal and the second terminal are provided outside of the sealing material.

8. A liquid crystal display device according to claim 7, wherein the high resistance elements are diodes.

9. A liquid crystal display device according to claim 7, wherein the high resistance elements are nonlinear elements.

* * * * *